United States Patent
Chen et al.

(10) Patent No.: US 10,642,079 B2
(45) Date of Patent: May 5, 2020

(54) DISPLAYS WITH DELAMINATION STOPPER AND CORROSION BLOCKING STRUCTURES

(71) Applicant: Apple Inc., Cupertino, CA (US)

(72) Inventors: Yu Cheng Chen, San Jose, CA (US); Cheng-Ho Yu, Milpitas, CA (US); Shin-Hung Yeh, Taipei (TW); Sungki Lee, Sunnyvale, CA (US)

(73) Assignee: Apple Inc., Cupe, AZ (US)

( * ) Notice: Subject to any disclaimer, the term of this patent is extended or adjusted under 35 U.S.C. 154(b) by 0 days.

(21) Appl. No.: 16/041,685

(22) Filed: Jul. 20, 2018

(65) Prior Publication Data

US 2019/0121183 A1    Apr. 25, 2019

Related U.S. Application Data

(60) Provisional application No. 62/576,994, filed on Oct. 25, 2017.

(51) Int. Cl.
| G02F 1/133 | (2006.01) |
| G02F 1/1335 | (2006.01) |
| G06F 3/044 | (2006.01) |
| G02F 1/1345 | (2006.01) |

(52) U.S. Cl.
CPC ........ G02F 1/13306 (2013.01); G02F 1/1345 (2013.01); G02F 1/13458 (2013.01); G02F 1/133514 (2013.01); G06F 3/044 (2013.01); G02F 1/133528 (2013.01); G02F 2201/50 (2013.01)

(58) Field of Classification Search
CPC .................................................. G02F 1/13306
See application file for complete search history.

(56) References Cited

U.S. PATENT DOCUMENTS

| 9,454,025 | B2 | 9/2016 | Zhong et al. |
| 9,494,818 | B2 | 11/2016 | Park et al. |
| 9,640,561 | B2 | 5/2017 | Park et al. |
| 2014/0085556 | A1 | 3/2014 | Yin et al. |
| 2017/0250367 | A1 | 8/2017 | Yasukawa |
| 2017/0263205 | A1* | 9/2017 | Takahashi ........... H03F 3/45475 |
| 2018/0301520 | A1* | 10/2018 | Jin ...................... H01L 27/3223 |

* cited by examiner

*Primary Examiner* — Edmond C Lau
(74) *Attorney, Agent, or Firm* — Treyz Law Group, P.C.; G. Victor Treyz; Matthew Williams

(57) ABSTRACT

A display may have contacts that mate with a flexible printed circuit. The contacts may be used in providing data and control signals to pixels. A metal layer may be patterned to form metal traces for signal lines that extend outwardly towards an edge of the display from the contacts. Delamination stopper structures may be formed along the periphery of the display to inhibit delamination between layers of material on the display. The delamination stopper structures may be formed from bent portions of the metal traces, a slot-shaped inorganic layer opening that runs perpendicular to the metal traces, and a segmented trench in an organic layer. A corrosion blocker structure may be formed by creating metal trace gaps in the metal traces that are each bridged by a pair of vias that are shorted together using transparent conductive material such as a pair of indium tin oxide layers.

20 Claims, 9 Drawing Sheets

DISPLAYS WITH DELAMINATION STOPPER AND CORROSION BLOCKING STRUCTURES

This application claims the benefit of provisional patent application No. 62/576,994, filed Oct. 25, 2017, which is hereby incorporated by reference herein in its entirety.

FIELD

This relates generally to electronic devices with displays, and, more particularly, to structures for protecting displays from damage.

BACKGROUND

Electronic devices often include displays. During use of an electronic device, the electronic device may be subjected to drop events and other impact events. These events may generate high levels of stress. A device may also be exposed to environmental contaminants such as moisture. If care is not taken, layers of material in a display may delaminate when exposed to high stress or metal traces in the display may become corroded when exposed to moisture.

SUMMARY

A display may have layers such as a thin-film transistor layer, a liquid crystal layer, and a color filter layer. Pixels may be formed from the layers of the display. Electrical contacts for providing data and control signals to the pixels may be formed from metal traces on the thin-film transistor layer. The thin-film transistor layer may also include organic and inorganic dielectric layers.

The metal traces may form signal lines that extend outwardly towards an edge of the display from the contacts and inwardly to the pixels. Delamination stopper structures may be formed along the periphery of the display to inhibit delamination between layers of material on the thin-film transistor layer. The delamination stopper structures may be formed from bent portions of the metal traces, a slot-shaped opening in the inorganic layer that runs perpendicular to the signal lines, and a segmented trench in the organic layer.

A corrosion blocker structure may be formed in each metal trace by creating a metal trace gap in the metal trace that is bridged by a pair of vias that are shorted together using transparent conductive material such as a pair of indium tin oxide layers.

DETAILED DESCRIPTION

Figure 1:
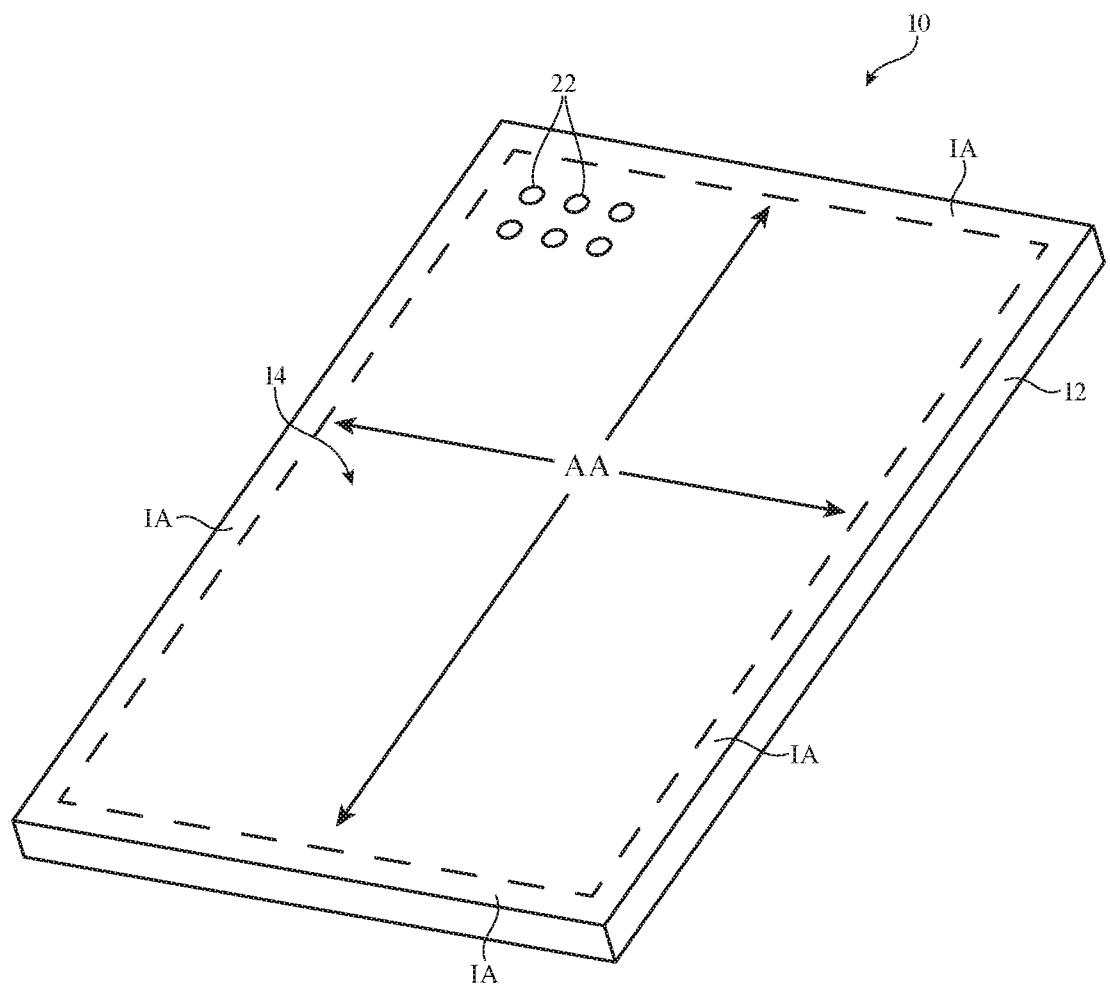
FIG. 1 is a perspective view of an illustrative electronic device having a display in accordance with an embodiment.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a computer display that does not contain an embedded computer, a computer display that includes an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, watch or other wrist device, or other portable computing device. Other configurations may be used for device 10 if desired. The example of FIG. 1 is merely illustrative.

In the example of FIG. 1, device 10 includes a display such as display 14 mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures. A touch sensor may be formed using electrodes or other structures on a display layer that contains a pixel array or on a separate touch panel layer that is attached to the pixel array (e.g., using adhesive).

Display 14 may include an array of pixels 22. The array of pixels in display 14 may form an active area such as active area AA of FIG. 1 in which images are displayed for a user. One or more edges of active area AA may be bordered by an inactive area that is free of pixels such as inactive areas IA. Borderless designs for display 14 and arrangements in which active area AA is bordered only on two sides by inactive areas IA may be used, if desired.

Pixels 22 may be formed from any suitable display pixel structures. Configurations in which display 14 is a liquid crystal display with a backlight and pixels 22 form an array of liquid crystal display pixels are sometimes described herein as an example. This use of liquid crystal display technology for forming display 14 is merely illustrative. Display 14 may, in general, be formed using any suitable type of pixels.

Display 14 may be protected using a display cover layer such as a layer of transparent glass or clear plastic. Openings may be formed in the display cover layer. For example, an opening may be formed in the display cover layer to accommodate a button, a speaker port, or other component. Openings may be formed in housing 12 to form communications ports (e.g., an audio jack port, a digital data port, etc.), to form openings for buttons, etc.

Figure 2:
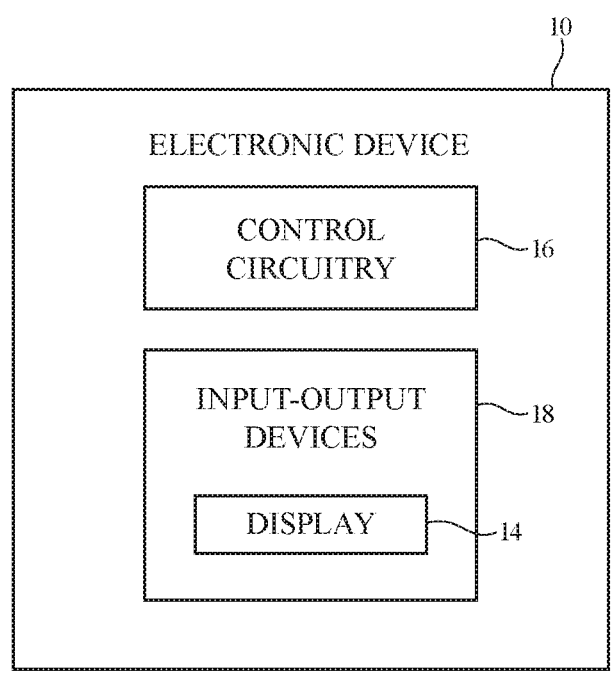
FIG. 2 is a schematic diagram of an illustrative electronic device having a display in accordance with an embodiment.

FIG. 2 is a schematic diagram of device 10. As shown in FIG. 2, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 18 may be used to allow data to be supplied to device 10 and to allow data to be provided from device 10 to external devices. Input-output devices 18 may include buttons, joysticks, scrolling wheels, touch pads, key pads, keyboards, microphones, speakers, tone generators, vibrators, cameras, sensors (e.g., ambient light sensors, proximity sensors, orientation sensors, magnetic sensors, force sensors, touch sensors, pressure sensors, fingerprint sensors, etc.), light-emitting diodes and other status indicators, data ports, etc. A user can control the operation of device 10 by supplying commands through input-output devices 18 and may receive status information and other output from device 10 using the output resources of input-output devices 18. Input-output devices 18 may include one or more displays such as display 14.

Control circuitry 16 may be used to run software on device 10 such as operating system code and applications. During operation of device 10, the software running on control circuitry 16 may display images on display 14 using an array of pixels in display 14. While displaying images, control circuitry 16 may control the transmission of each of the pixels in the array and can make adjustments to the amount of backlight illumination for the array that is being produced by backlight structures in display 14.

Display 14 may have a rectangular shape (i.e., display 14 may have a rectangular footprint and a rectangular peripheral edge that runs around the rectangular footprint) or may have other suitable shapes. Display 14 may be planar or may have a curved profile.

Figure 3:
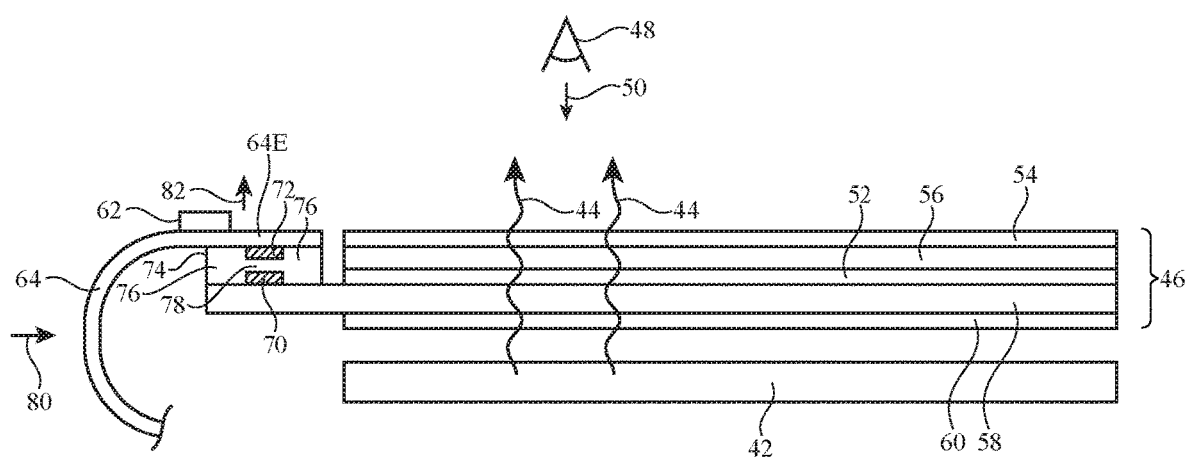
FIG. 3 is a cross-sectional side view of an illustrative display in accordance with an embodiment.

A cross-sectional side view of display 14 is shown in FIG. 3. As shown in FIG. 3, display 14 may include backlight structures such as backlight unit (backlight) 42 for producing backlight such as backlight illumination 44. During operation, backlight illumination 44 travels outwards (vertically upwards in dimension Z in the orientation of FIG. 3) and passes through display pixel structures in display layers 46. This illuminates any images that are being produced by the display pixels for viewing by a user. For example, backlight illumination 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 58 and 56 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of pixel circuits based on thin-film transistors and associated electrodes (pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer. Configurations in which color filter elements are combined with thin-film transistor structures on a common substrate layer in the upper or lower portion of display 14 may also be used.

During operation of display 14 in device 10, control circuitry (e.g., one or more integrated circuits on a printed circuit) may be used to generate information to be displayed on display 14 (e.g., display data). The information to be displayed may be conveyed to one or more display driver integrated circuits such as illustrative circuit 62 using a signal path such as a signal path formed from conductive metal traces in a rigid or flexible printed circuit such as printed circuit 64 (as an example). Signal paths in printed circuit 64 may also form connections with control circuits (e.g., integrated circuits forming control circuitry 16 on one or more additional printed circuits).

Thin-film transistor layer 58 may have metal traces that form signal lines (e.g., data lines, gate lines, clock signal lines, power supply paths, etc.). These signal lines may be coupled to metal traces such as contacts 70 (sometimes referred to as thin-film transistor layer contacts, display contacts, electrical contacts, or pads). Each contact 70 may be electrically coupled to a corresponding contact 72 on flexible printed circuit 64. Signal lines in printed circuit 64 may be used in coupling contacts 72 to circuitry in display driver circuit 62 and/or other circuitry in device 10. Anisotropic conductive film 74 or other electrical coupling structures may be used in electrically coupling contacts 70 in display 14 to corresponding flexible printed circuit contacts (pads) such as contacts 72 on flexible printed circuit 76. Film 74 may include conductive particles in a polymer binder. When contacts 72 are pressed towards contacts 70, portions 78 of film 74 will be compressed sufficiently that the conductive particles in portions 78 will form electrical connections between respective contacts 70 and 72. Less compressed portions of film 74 such as portions 76 will remain insulating. In this way, flexible printed circuit 64 may be attached to display 14 to convey signals between circuit 62 and pixels 22 on layer 58.

When device 10 is dropped (e.g., on its end), flexible printed circuit 64 may be pressed in direction 80, causing end portion 64E of flexible printed circuit 64 to be forced in upwards direction 82. This may cause delamination among the thin-film layers on layer 58 that are coupled to film 74. Thin-film delamination can damage display 14 and cause display 14 to fail or become vulnerable to environmental contamination. To prevent delamination and corrosion along the edge of display 14, peripheral portions of display 14 can be provide with delamination stopper structures and corrosion blocking structures. These structures may be formed, for example, in inactive area IA along the border of pixels 22.

In active area AA, pixels 22 may be formed from thin-film transistor circuitry in layer 58. As an example, each pixel 22 may have a transistor such as transistor 84 of FIG. 4. Transistors such as transistor 84 may be formed from semiconductor layers, dielectric layers, and metal layers in thin-film transistor circuitry (layer) 88 on substrate 100 in layer 58. One of the source-drain terminals of each transistor 84 may be coupled to pixel electrodes 98F using conductive via layer 98. Dielectric layer 96 may be interposed between electrodes (electrode fingers) 98F and common voltage (Vcom) electrode 94. During operation, transistor 84 may be used in controlling the voltage applied to electrodes 98F and therefore used in controlling the electric field through an associated portion of liquid crystal layer 52 (FIG. 3). To permit backlight illumination 44 to pass through pixel 22, the conductive layer that forms electrodes 98F and via layer 98 and the conductive layer that forms common voltage electrode 94 may be formed from a transparent conductive material such as indium tin oxide. The thickness of each of these two indium tin oxide layers may be about 50-100 nm, at least 10 nm, less than 500 nm, or other suitable thickness. In inactive area IA, the layers of indium tin oxide may be used in forming corrosion blocker structures for display 14. Inactive area IA may also include delamination stopper structures that inhibit delamination among the thin-film layers of display 14.

Figure 5:
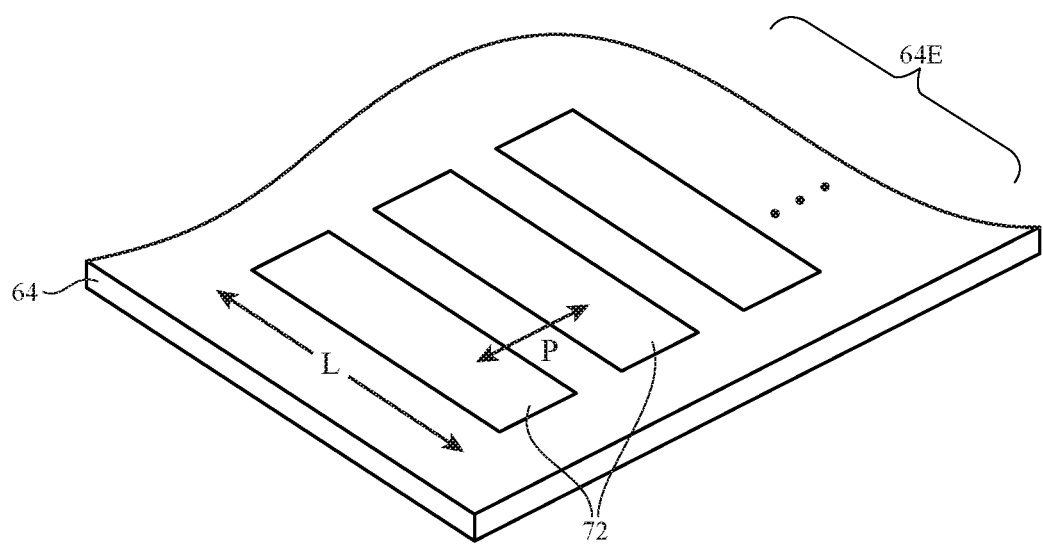
FIG. 5 is a perspective view of an illustrative array of contacts on the end of a flexible printed circuit in accordance with an embodiment.

FIG. 5 is a bottom perspective view of an illustrative flexible printed circuit end portion 64E for flexible printed circuit 64. As shown in FIG. 5, flexible printed circuit 64 may have a series of contacts 72 (e.g., conductive pads). Contacts 72 may have rectangular shapes or other suitable shapes. The length L of each contacts 72 may be 100-300 microns, at least 50 microns, less than 500 microns, or other suitable length. The pitch (center-to-center spacing) between adjacent contacts 72 may be about 30-50 microns, at least 10 microns, less than 60 microns, or other suitable pitch. The width perpendicular to length L of each contact 72 may be about 10-50 microns, at least 5 microns, at least 20 microns, less than 40 microns, or other suitable width. In the example of FIG. 5, there is a single row of contacts 72 on flexible printed circuit 64. If desired, multiple staggered rows of contacts 72 may be provided.

Figure 6:
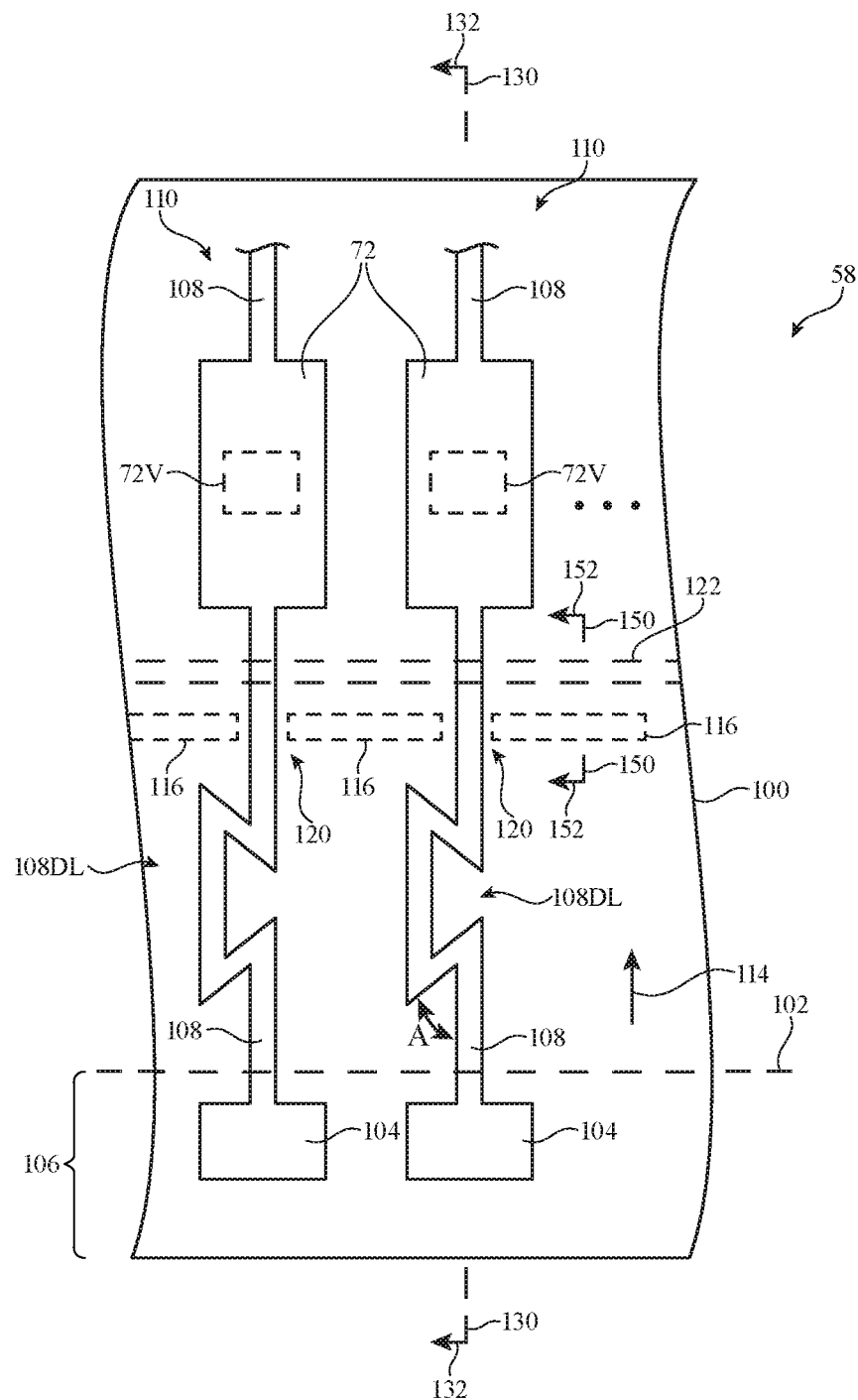
FIG. 6 is a top view of an edge portion of an illustrative display with an array of contacts to be bonded to the contacts of the flexible printed circuit of FIG. 5 in accordance with an embodiment.

Illustrative delamination stopper (blocking) structures for display 14 are shown in the top view of the illustrative edge portion of thin-film transistor layer 58 of display 14 of FIG. 6. As shown in FIG. 6, thin-film transistor layer 58 may be formed from a substrate such as substrate 100. Metal traces 108 form signal lines that couple contacts 72 to the thin-film circuitry of active area AA (e.g., pixels 22) and that extend outwardly to respective test pads 104 on substrate 100. Traces 108 may have a thickness of 0.3 microns, at least 0.1 microns, less than 0.5 microns, or other suitable thickness. During manufacturing, probes in test equipment form electrical contacts with pads 104 and are used in testing display 14. After satisfactory testing, substrate 100 is cut along cut line 102 (e.g., by scribing-and-breaking techniques, sawing, etc.). This removes test pad portion 106 of substrate 100 from the remainder of substrate 100, thereby trimming thin-film transistor layer 58 to its desired final shape (e.g., a shape that minimizes that size of inactive border region IA). After flexible printed circuit 64 is coupled to thin-film transistor layer 58 by film 76, signals from flexible printed circuit 64 may be conveyed to circuitry in pixels 22 using metal traces 108 at locations 110 that are coupled to contacts 72. In some configurations, contacts 72 may have via portions such as vias 72V for coupling the conductive material of contacts 72 to metal traces 108. Corrosion blocking structures formed from vias may also be interposed in metal traces 108.

Thin-film transistor layer 58 may have structures that prevent delamination between the thin-film layers that form the thin-film transistor circuitry layer on substrate 100. These delamination stopper structures may include, for example, metal trace delamination stopper portions 108DL in metal traces 108. As shown in FIG. 6, portions 108DL of traces 108 may have bends that help prevent any delamination that is occurring at the outer edge of layer 58 from propagating inward in direction 114. In particular, bent portions 108DL may have one or more bends characterized by a bend angle A of less than 90°, less than 80°, less than 50°, at least 20°, at least 35°, or other suitable bend angle. Sharp bends (e.g., bends that cause some of trace 108 to reverse course) may help prevent any delamination that is initiated in direction 114 from propagating past the bend. In this way, portions 108DL serve as metal trace delamination stopper structures.

Another type of delamination stopper structure that may be used along the edge of thin-film transistor layer 58 is delamination stopper trench 116. Trench 116 may penetrate through a planarization layer (e.g., a polymer planarization layer PLN), one or more inorganic dielectric layers (e.g., an interlayer dielectric layer ILD), and/or other thin-film layers on the surface of substrate 100. Trench 116 may run perpendicular to metal traces 108 (e.g., parallel to the adjacent edge of thin-film transistor layer 58). To prevent trench 116 from exposing metal traces 108 to moisture, trench 116 may be segmented and have a series of gaps 120, each of which is sufficiently wide to allow a respective one of metal traces 108 to pass. Configurations in which trench 116 is not segmented may also be used in forming delamination stopper structures.

Figure 4:
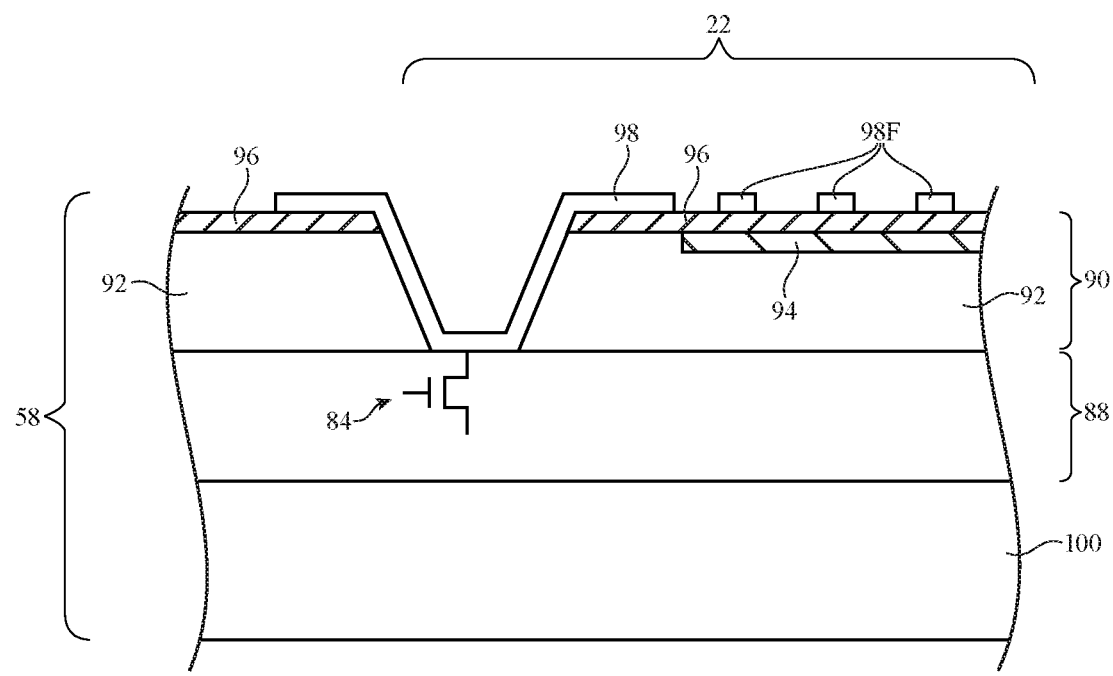
FIG. 4 is a cross-sectional side view of a portion of a thin-film transistor layer in a display in accordance with an embodiment.

The thin-film layers that cover the surface of substrate 100 in thin-film transistor layer 58 may include an inorganic dielectric layer such as silicon nitride layer 96 of FIG. 4. This layer may delaminate from the other layers on substrate 100 when stress is applied. To prevent delamination from propagating inwardly in direction 114, layer 96 may be provided with a strip-shaped opening such as opening 122. This slot-shaped opening may extend parallel to the edge of layer 58 and may overlap each of traces 108. If delamination of layer 96 is initiated at the edge of layer 56 and begins to propagate inwardly in direction 114, the absence of layer 96 in the gap formed from opening 122 will help decouple the inner portion of layer 96 from the delaminated outer portion of layer 96 and thereby prevent layer 96 from delaminating further.

Figure 7:
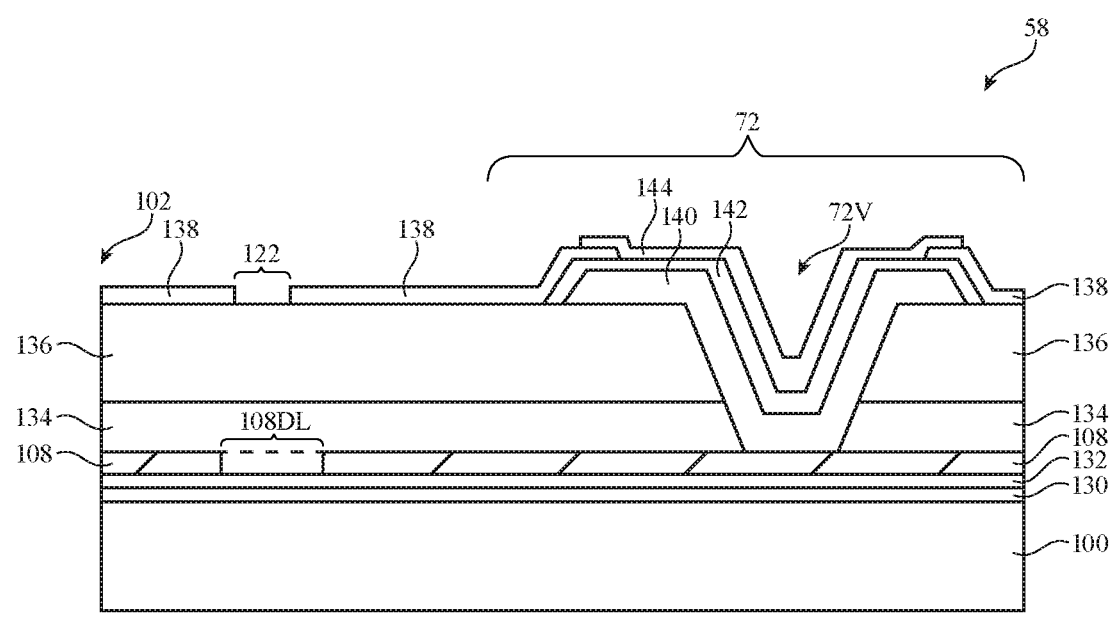
FIGS. 7 and 8 are cross-sectional side views of illustrative delamination stoppers in a display in accordance with embodiments.

FIG. 7 is a cross-sectional side view of layer 58 of FIG. 6 taken along line 130 and viewed in direction 132. As shown in FIG. 7, layer 58 may include dielectric layers such as dielectric buffer layer 130 (e.g., inorganic dielectric layer(s) such as silicon oxide and/or silicon nitride) and gate insulator layer 132 (e.g., a layer of silicon oxide or other inorganic dielectric). Metal trace 108 may be formed from a patterned metal layer on a layer of dielectric such as one or more of layers 130, 132, etc. Portions 108DL of trace 108 may form delamination stopper structures, as described in connection with FIG. 8. Metal layer 140 may form a conductive via layer for via 72V. Transparent conductive layers such as indium tin oxide layers 142 and 144 may also form conductive layers for via 72V and may be shorted to each other and to metal layer 140.

Contact 72 may be formed from rectangular conductive structures (e.g., transparent conductive structures) such as rectangular patches formed from lower indium tin oxide layer 142 and upper indium tin oxide layer 144. Using metal layer 104 and layers 142 and 144, via 72V may electrically couple the conductive structures of contact 72 to metal trace 108 through interposed dielectric layers such as interlayer dielectric layer 134 and planarization layer 136. Layer 134 may include one or more inorganic dielectric layers and may have an overall thickness of about 0.4-0.7 microns, at least 0.3 microns, less than 0.8 microns, or other suitable thickness. Planarization layer 136 may be an organic dielectric layer such as a polymer layer with a thickness of 2-3 microns, at least 1 micron, less than 4 microns, or other suitable thickness.

A protective coating layer such as silicon nitride layer 138 or other inorganic dielectric layer may cover planarization layer 136. Layer 138 may have a thickness of 100-200 nm, at least 75 nm, less than 300 nm, or other suitable thickness. As described in connection with FIG. 6, opening 122 (e.g., a strip-shaped opening that extends into the page in the orientation of FIG. 7, perpendicular to the signal lines formed from metal traces 108) may serve as a delamination stopper structure by helping to prevent further inward propagation of any delamination that is taking place between layer 138 and layer 136 at the edge of layer 58 (e.g., at cut line 102).

Figure 8:
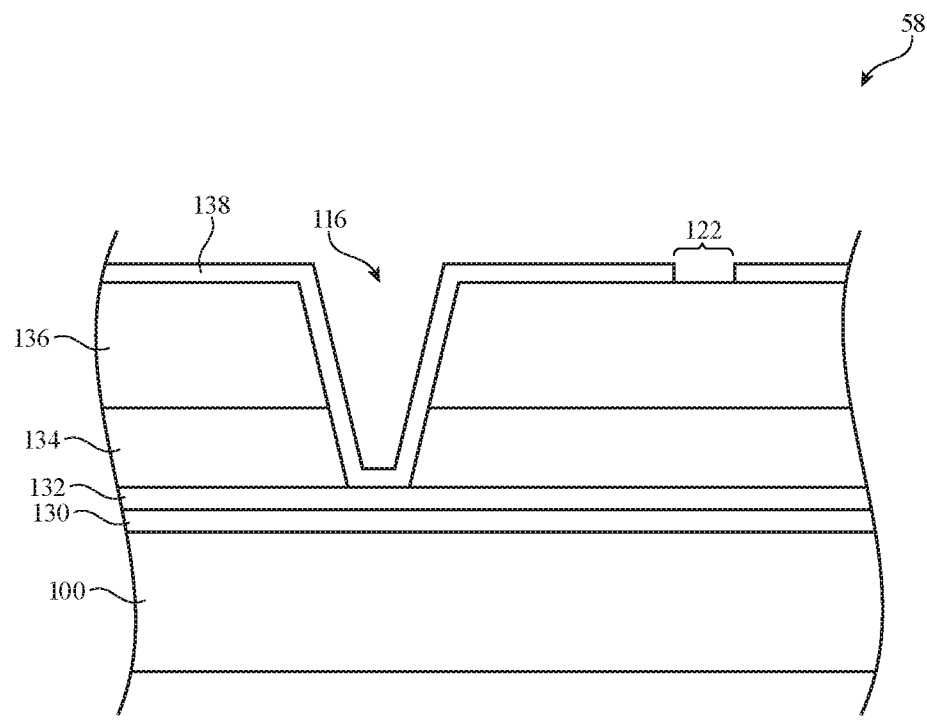

FIG. 8 is a cross-sectional side view of layer 58 of FIG. 6 taken along line 150 and viewed in direction 152. As shown in FIG. 8, trench 116 may extend through layers 136 and 134 and may serve as an additional delamination stopper structure that further hinders the inward propagation of any delamination among the layers of layer 58 (e.g., delamination between layer 132 and/or delamination between other layers in layer 58).

Figure 9:
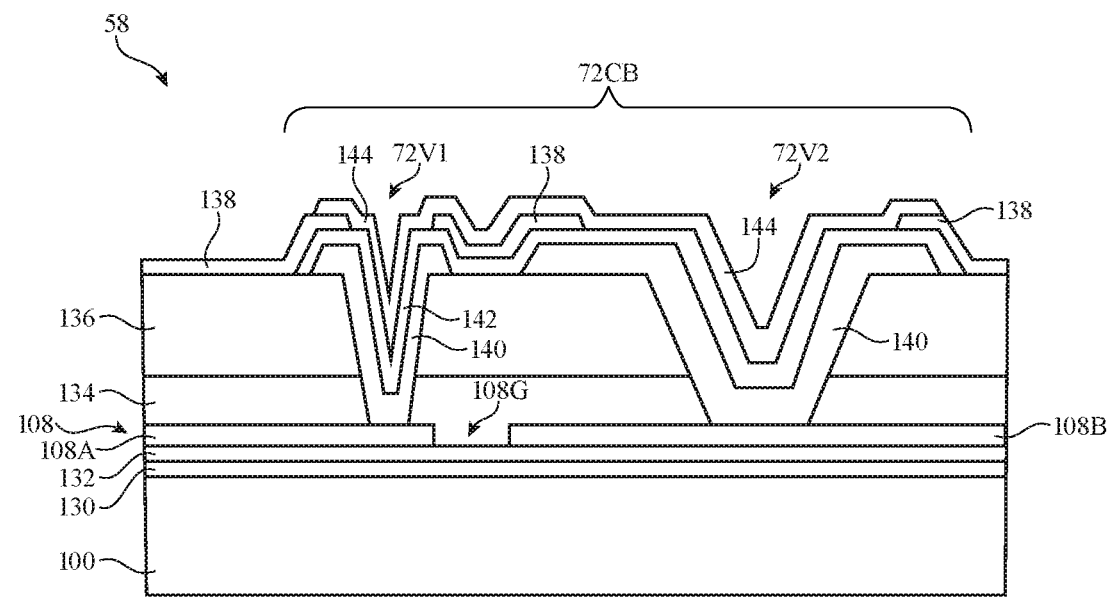
FIG. 9 is a cross-sectional side view of an illustrative corrosion blocking structure for a display in accordance with an embodiment.

FIG. 9 is a cross-sectional side view of an illustrative corrosion blocker structure 72CB that may be used in layer 58. Corrosion blocker structure 72CB of FIG. 9 includes vias 72V1 and 72V2 and other conductive structures formed from metal layer 140 and indium tin oxide layers or other transparent conductive layers 142 and 144. The presence of structure 72CB can help prevent ingress of corrosion from exposure to moisture or other environmental contaminants. Structure 72CB of FIG. 9 may form a contact such as contact 72 of FIG. 6 that mates with a flexible printed circuit contact or may be interposed elsewhere along the length of metal trace 108. Metal trace 108 may have a metal trace gap such as gap 108G that separates a first portion of trace 108 (outer portion 108A) from a second portion of trace 108 (inner portion 108B). Due to the presence of gap 108G, corrosion cannot progress inwardly along trace 108 past gap 108G. Vias 72V1 and 72V2 are shorted together by layers 142 and 144 and form a conductive path between portions 108A and 108B. This path bridges gap 108G and shorts portions 108A and 108B together. As a result, portions 108A and 108B are electrically connected while being physically disconnected at gap 108G, thereby allowing signals to pass along metal trace 108 during testing and/or normal operation. The indium tin oxide in layers 142 and 144 is resistant to corrosion damage upon exposure to moisture, so layers 142 and 144 are less sensitive to moisture than metal trace 108. This helps ensure that layers 142 and 144 of shorted vias 72V1 and 72V2 will not be corroded and will remain conductive while preventing corrosion from progressing past gap 108G.

Figure 10:
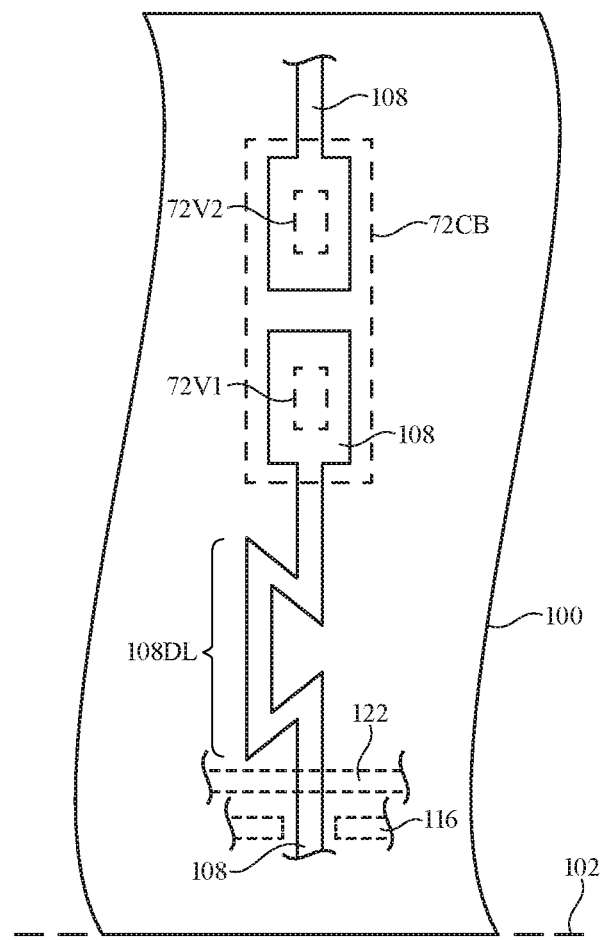
FIG. 10 is a top view of the corrosion blocking structure of FIG. 9 in accordance with an embodiment.

FIG. 10 is a top view of illustrative corrosion blocker structures 72CB of FIG. 9. In this illustrative configuration for layer 58, delamination stopper structures such as trench 116, opening 122, and portions 108DL of trace 108 are interposed between the outer edge of layer 58 (e.g., the edge of substrate 100 formed by cut line 102) and corrosion blocker structures 72CB (and pixels 22 of active area AA). Structures 72CB may form a contact (see, e.g., contact 72 of FIG. 6) or may be interposed between the outer edge of layer 58 and contact 72. In the example of FIG. 10, portion 108DL is interposed between structure 72CB and opening 122. Opening 122 is interposed between trench 116 and portion 108DL. In the example of FIG. 6, trench 116 is interposed between opening 122 and portion 108DL. Other illustrative configurations may be used for forming delamination stopper structures (portion 108DL, trench 116, and/or opening 122) and/or corrosion blocker structures such as structure 72CB. The configurations of FIGS. 6 and 10 are merely illustrative.

The foregoing is merely illustrative and various modifications can be made to the described embodiments. The foregoing embodiments may be implemented individually or in any combination.

What is claimed is:

1. A display, comprising:
    pixels that are configured to display images, wherein the pixels are formed using layers on a substrate, wherein the layers on the substrate are configured to form contacts, and wherein the substrate has an edge;
    a flexible printed circuit configured to bond to the contacts;
    metal traces that form signal lines that extend respectively between each of the contacts and the edge; and
    delamination stopper structures between the contacts and the edge that are configured to inhibit delamination in the layers, wherein the delamination stopper structures include an opening with a slot shape in at least one layer in the layers and wherein the opening extends at a non-zero angle from the metal traces.

2. The display defined in claim 1 wherein the delamination stopper structures include portions of the metal traces with bends.

3. The display defined in claim 2 wherein the layers include an inorganic dielectric layer and wherein the opening is the inorganic dielectric layer.

4. The display defined in claim 3 wherein the opening runs perpendicular to the metal traces.

5. The display defined in claim 4 wherein the layers include an organic dielectric layer and wherein the inorganic dielectric layer is formed on the organic dielectric layer.

6. The display defined in claim 5 wherein the delamination stopper structures include a trench.

7. The display defined in claim 6 wherein the trench is formed in at least the organic dielectric layer and runs parallel to the opening.

8. The display defined in claim 7 wherein the trench is segmented and has a series of gaps.

9. The display defined in claim 8 wherein each of the metal traces passes through a respective one of the gaps in the trench.

10. The display defined in claim 9 wherein each metal trace has a metal trace gap that separates a first portion of that metal trace from a second portion of that metal trace.

11. The display defined in claim 10 further comprising transparent conductive material that electrically shorts the first portion to the second portion in each metal trace.

12. The display defined in claim 11 wherein the transparent conductive material includes first and second layers of indium tin oxide.

13. The display defined in claim 12 further comprising, for each metal trace, first and second vias that are shorted to each other using the transparent conductive material, wherein the first via is shorted to the first portion of that metal trace and wherein the second via is shorted to the second portion of that metal trace.

14. The display defined in claim 1 wherein each metal trace has a metal trace gap that is bridged by a corrosion blocker structure having first and second vias that are shorted to each other.

15. The display defined in claim 14 further comprising at least one layer of transparent conductive material that is included in the first and second vias and that shorts the first via to the second via.

16. A display, comprising:
pixels that are configured to display images, wherein the pixels are formed using layers on a substrate, wherein the layers on the substrate are configured to form contacts and wherein the substrate has an edge;
anisotropic conductive film;
a flexible printed circuit bonded to the contacts with the anisotropic conductive film;
metal traces, wherein each metal trace extends between a respective one of the contacts and the edge, wherein the delamination stopper structures include portions of the metal traces that bend at an acute angle; and
delamination stopper structures between the contacts and the edge that are configured to inhibit delamination in the layers.

17. The display defined in claim 16 further comprising corrosion blocker structures interposed in each metal trace.

18. The display defined in claim 17 wherein the layers include an organic layer and an inorganic layer on the organic layer and wherein the delamination stopper structures include an opening in the inorganic layer and a trench in the organic layer.

19. The display defined in claim 18 wherein the corrosion blocker structures include first and second vias coupled respectively to first and second portions of each metal trace that are separated by a metal trace gap.

20. A display with contacts configured to bond to a flexible printed circuit using anisotropic conductive film, comprising:
pixels that are configured to display images, wherein the pixels are formed using first and second layers and a layer of liquid crystal material between the first and second layers, wherein the first layer is a thin-film transistor layer having thin-film transistor circuitry formed on a substrate, wherein the substrate has an edge, and wherein the thin-film transistor circuitry is formed from a plurality of layers of material including an organic dielectric layer, an inorganic dielectric layer, and at least one metal layer configured to form signal lines that extend from the contacts to the edge of the substrate; and
delamination stopper structures between the contacts and the edge that are configured to inhibit delamination in the layers of material, wherein the delamination stopper structures include bent portions of the signal lines, an opening in the inorganic dielectric layer, and a trench in the organic dielectric layer.

\* \* \* \* \*